(12) United States Patent
Liu

(10) Patent No.: US 6,669,547 B2
(45) Date of Patent: Dec. 30, 2003

(54) MULTI-STACK EXHAUST SYSTEM

(75) Inventor: Mingsheng Liu, Omaha, NE (US)

(73) Assignee: Board of Regents of University of Nebraska, Lincoln, NE (US)

( * ) Notice: Subject to any disclaimer, the term of this patent is extended or adjusted under 35 U.S.C. 154(b) by 0 days.

(21) Appl. No.: 10/229,990

(22) Filed: Aug. 28, 2002

(65) Prior Publication Data

US 2003/0104778 A1 Jun. 5, 2003

Related U.S. Application Data

(60) Provisional application No. 60/315,475, filed on Aug. 28, 2001.

(51) Int. Cl.[7] ............................................. B08B 15/02
(52) U.S. Cl. .................................. 454/61; 126/299 F
(58) Field of Search ........................... 454/61, 49, 56, 454/57; 126/299 F, 299 R

(56) References Cited

U.S. PATENT DOCUMENTS 4,741,257 A * 5/1988 Wiggin et al. ................ 454/56
5,997,399 A * 12/1999 Szatmary ..................... 454/187

\* cited by examiner

*Primary Examiner*—Derek Boles
(74) *Attorney, Agent, or Firm*—Shook, Hardy & Bacon LLP

(57) ABSTRACT

A multi-stack exhaust system and method including at least one fume hood, multiple exhaust stacks, each stack having a return duct with a return damper and a discharge duct with a discharge damper, a fan, a flow sensor, a first static pressure sensor for measuring the static pressure at the inlet duct, a second static pressure sensor for measuring the static pressure at the at least two exhaust stacks, and a controller.

22 Claims, 2 Drawing Sheets

MULTI-STACK EXHAUST SYSTEM

CROSS-REFERENCE TO RELATED APPLICATIONS

This application claims the benefit under 35 U.S.C. 119(e) of U.S. Provisional Application No. 60/315,475, filed on Aug. 28, 2001.

STATEMENT REGARDING FEDERALLY SPONSORED RESEARCH OR DEVELOPMENT

Not Applicable.

TECHNICAL FIELD

This invention relates generally to exhaust systems, and more particularly to a stack exhaust system designed to minimize energy consumption.

BACKGROUND OF THE INVENTION

The goal of stack exhaust systems is to exhaust toxic air from buildings to heights sufficient to avoid fresh air contamination and environmental pollution. Further considerations include prevention of condensed moisture in the stack and prevention of rain in the stack. Due to architectural and structural requirements, stack heights of stack exhaust systems are often required to be as short as possible. In order to satisfy environmental concerns and meet the architectural and structural requirements, stack exhaust systems are designed to exhaust air at sufficient velocities to create sufficient momentum to send the toxic air substantially higher than the stack and avoid contamination by the toxic air or recirculation of the toxic air.

FIG. 1 depicts a prior art stack exhaust system flow chart, which includes a stack 28, a fan 24, a make-up air damper 36, fume hoods 12, a static pressure sensor 20, and a controller 34. Because the fume hoods 12 are in standby mode most of the time, the total exhaust airflow from the fume hoods 12 is usually below the airflow for which the system is optimally designed.

The stack exhaust system of the prior art maintains the static pressure of the system by adjustment of the make-up air damper 36. That is, in order to maintain a constant discharge velocity, the system most operate at a constant volume. Therefore, when the total exhaust airflow from the fume hoods 12 is less than the design airflow, the controller opens the make-up air damper 36 to maintain the static pressure of the system.

The static pressure is typically measured at a common exhaust header 16 different than the mixing-joint 85 of the make-up air and the exhaust air. For example, the static pressure sensor 20 may be located either in the exhaust system farthest from the main riser or in the main plenum, because adequate static pressure must be maintained in the ductwork farthest from the exhaust fan plenum. As a result, the static pressure at the inlet of the fan is much greater under partial-exhaust airflow with make-up air conditions, than under full-exhaust airflow without make-up air conditions, and, thus, the airflow through the fan is higher than the design airflow. Consequently, fan energy consumption is higher under conditions of partial-exhaust airflow than under design conditions of full-exhaust airflow. In addition, fan motor overload is common due to the higher-than-design airflow.

SUMMARY OF THE INVENTION

The present invention is directed to a multi-stack exhaust system and method. It is desirable for the system to include at least one fume hood adapted for intake of toxic exhaust into an inlet duct in fluid communication with the at least one fume hood. In addition, it is desirable for the system to include at least two exhaust stacks, each stack having a return duct with a return damper and a discharge duct with a discharge damper. The return duct returns air and/or toxic exhaust to the inlet duct and the discharge duct discharges toxic exhaust to the environment. In another desirable embodiment the system further includes a fan, adapted to convey the toxic exhaust from the inlet duct to the at least two exhaust stacks. The system also may include a flow sensor for measuring the flow of toxic exhaust in the inlet duct, wherein the discharge dampers are adjusted such that the total flow from the discharge ducts is approximately equal to the flow of toxic exhaust in the inlet duct. It is also desirable that a first static pressure sensor for measuring the static pressure at the inlet duct, wherein an inlet duct static pressure set point is maintained by adjustment of the return dampers. Finally, it is desirable that a second static pressure sensor for measuring the static pressure at the at least two exhaust stacks, wherein an outlet duct static pressure set point is maintained by adjustment of the speed of the exhaust fan.

A desirable method for exhausting toxic exhaust includes generating toxic exhaust in at least one fume hood and passing the exhaust from the at least one fume hood to an inlet duct in fluid communication with the at least one fume hood. It is also desirable that the method include conveying the toxic exhaust to at least two exhaust stacks by a fan, each stack having a return duct with a return damper and a discharge duct with a discharge damper, wherein the return duct returns air and/or toxic exhaust to the inlet duct and the discharge duct discharges toxic exhaust to the environment. The method may also include measuring the flow of toxic exhaust in the inlet duct, wherein the discharge dampers are adjusted such that the total flow from the discharge ducts is approximately equal to the flow of toxic exhaust in the inlet duct. Also, it is desirable that the method include measuring the static pressure at the inlet duct, wherein an inlet duct static pressure set point is maintained by adjustment of the return dampers and measuring the static pressure at the at least two exhaust stacks, wherein an outlet duct static pressure set point is maintained by adjustment of the speed of the exhaust fan.

Additional objects, advantages, and novel features of the invention will be set forth in the description that follows and in part will become apparent to those skilled in the art upon examination of the following, or may be learned by practice of the invention.

BRIEF DESCRIPTION OF THE DRAWINGS

In the accompanying drawings, which form a part of the specification and are to be read in conjunction therewith.

DETAILED DESCRIPTION OF THE PREFERRED EMBODIMENT

Figure 1:
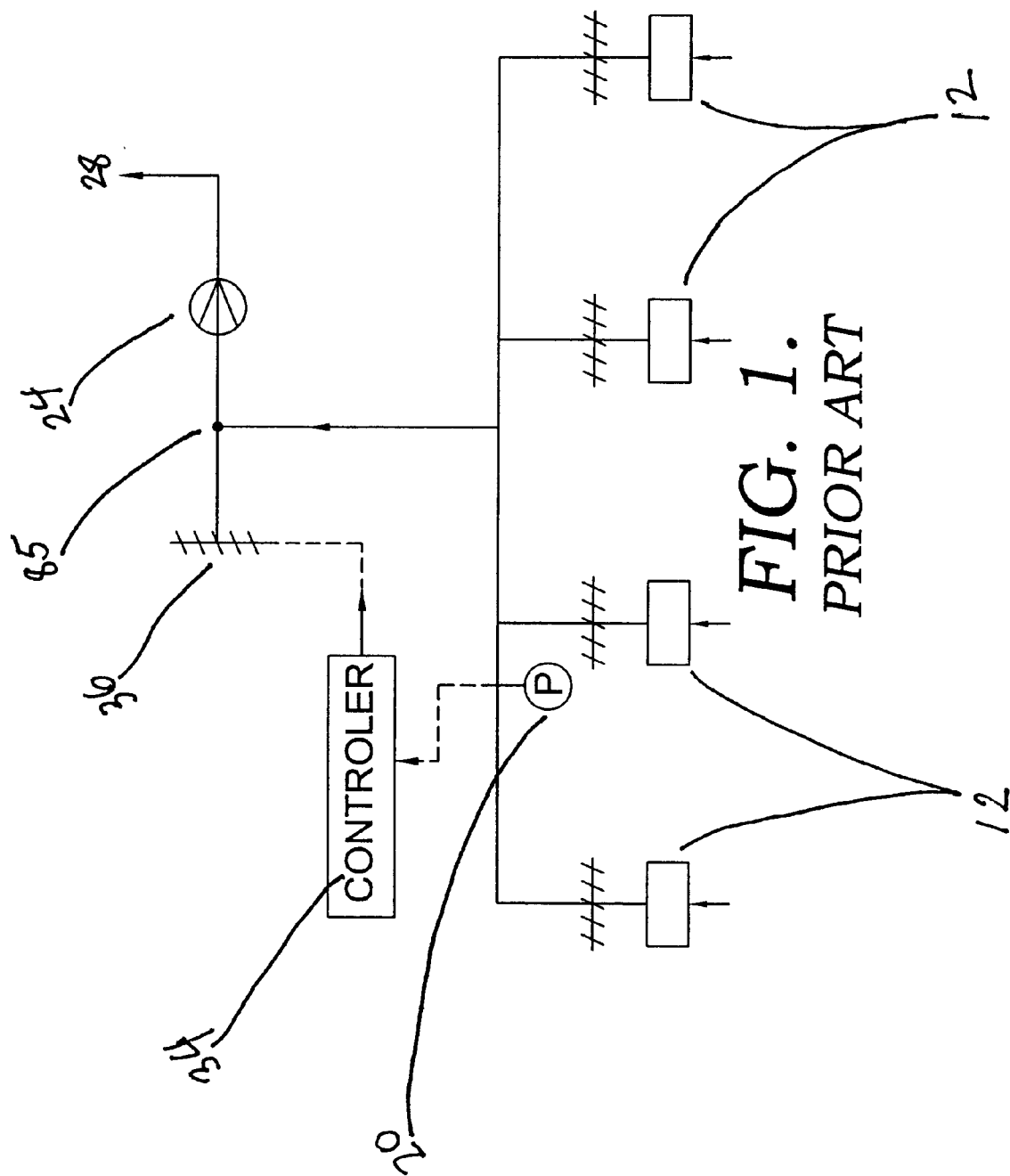
FIG. 1 is a flowchart of a prior art stack exhaust system.
Figure 2:
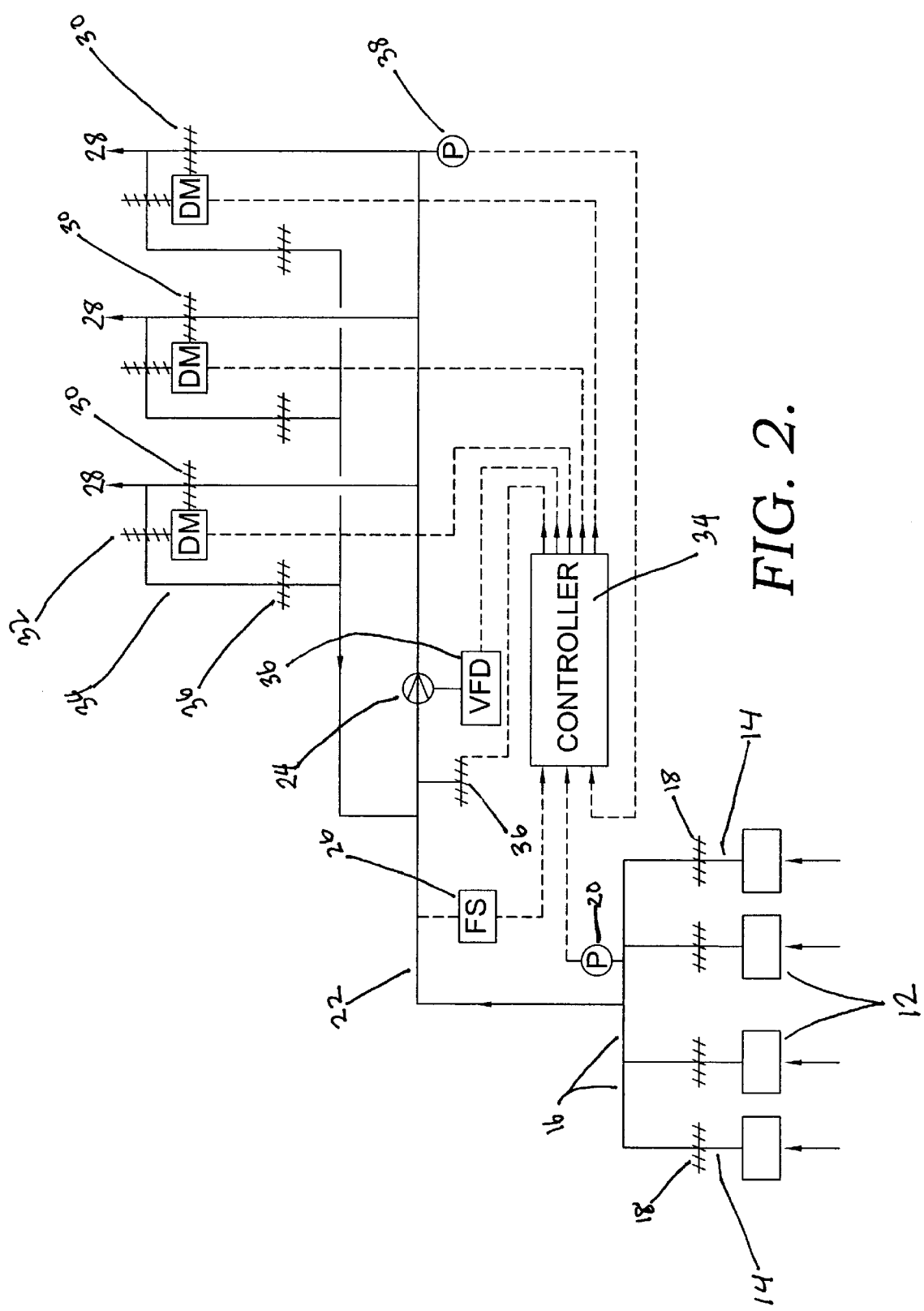
FIG. 2 is a flowchart of a multi-stack exhaust system.

A multi-stack exhaust system generally embodying the principles of the invention is shown in FIG. 2. The multi-stack exhaust system of the present invention maintains the toxic exhaust exit velocity or momentum from the stacks. Further, the fan energy consumption is minimized by adjusting the flow rate through the stacks and adjusting the number of stacks in operation.

At least one fume hood 12 collects and discharges toxic exhaust through individual fume hood exhaust conduits 14 and into a common exhaust header 16. Individual fume hood exhaust dampers 18 may be positioned in the individual fume hood exhaust conduits 14, as depicted in FIG. 2, to enable a particular fume hood 12 to be isolated from the system.

A static pressure sensor and transmitter 20 is located at exhaust header 16 and measures the static pressure of the exhaust within the header 16. The pressure sensor and transmitter 20 is adapted to transmit a signal proportional to the static pressure of the exhaust within the header 16. The proportional transmitter signal may be a pulse signal, a 4–20 mA signal, or other electrical or digital signal commonly employed by and well known to those skilled in the art.

A header discharge conduit 22 conveys exhaust from the header 16 to the inlet of a fan 24. The fan 24 is generally motor driven. As seen in FIG. 2, a flow sensor and transmitter 26 is located at header discharge conduit 22, upstream of the fan 24, and measures the flow rate of the exhaust flowing from the header 16 to the inlet of the fan 24. The flow sensor and transmitter 26 is adapted to transmit a signal proportional to the flow rate of the exhaust flowing from the header 16 to the inlet of the fan 24. The proportional transmitter signal may be a pulse signal, a 4–20 mA signal, or other electrical or digital signal commonly employed by and well known to those skilled in the art.

Exhaust is conveyed from the exhaust header 16, through the header discharge conduit 22 and motor-driven fan 24, into and through multiple exhaust stacks 28, and into the atmosphere.

Each exhaust stack 28 has an adjustable discharge air damper 30 and an adjustable return air damper 32. The discharge air dampers 30 are adjusted based upon the measured flow rate at the flow sensor and transmitter 26 and based upon the design flow of each stack. The discharge air dampers 30 are modulated by a controller 34. Preferably, the discharge air dampers 30 are adjusted such that the number of discharge air dampers 30 in the open position are minimized.

The discharge air dampers 30 and the return air dampers 32 are interlocked for each exhaust stack 28. When the discharge air damper 30 is open, the return air damper 32 is closed. When the discharge air damper 30 is closed, the return air damper 32 is open. The return air dampers 32 are located on return air ducts 34. The return air ducts 34 prevent leakage air to the environment from the stacks 28.

A manual damper 36 is preferably installed in the return air duct 34. The manual dampers 36 are used to set up and adjust the return airflow.

A static pressure sensor and transmitter 38 is located between the fan 24 and the exhaust stacks 28 and measures the static pressure of the exhaust exiting the fan 24. The static pressure sensor and transmitter 38 is adapted to transmit a signal proportional to the static pressure of the exhaust exiting the fan 24. The proportional transmitter signal may be a pulse signal, a 4–20 mA signal, or other electrical or digital signal commonly employed by and well known to those skilled in the art.

The set point of the static pressure of the exhaust exiting the fan 24 is set to maintain a minimum required exit velocity and momentum of the exhaust from the stacks 28. The controller 34 modulates the fan speed to maintain the static pressure set point of the exhaust exiting the fan 24. If the static pressure is lower than the set point, the controller 34 will speed up the fan 24, and vice versa.

The set point of the static pressure at exhaust header 16 (before the fan 24) depends on the requirements of the fume hoods 12 and layout of the exhaust system ductwork. The controller 34 modulates a makeup air damper 36 to maintain the static pressure set point at exhaust header 16. If the pressure is lower than the set point, the controller will open makeup air damper 36, and vice versa.

The controller 34 is typically a programmable logic controller (PLC) or other programmable controller of the type commonly used by and well known to those skilled in the art. The controller 34 receives and processes a signal from the static pressure sensor and transmitter 20 proportional to the static pressure of the header 16. The controller 34 also receives and processes a signal from the flow sensor and transmitter 26 proportional to the rate of exhaust flow from the header 16 to the fan 24. Further, the controller 34 received and processes a signal from the static pressure sensor and transmitter 38 proportional to the static pressure between the fan 24 and the exhaust stacks 28. The controller may be programmed with a variety of desired set points, including various static pressure set points, total pressure set points, and design stack exhaust flow rates. The controller 34 is adapted to transmit a signal to a variable speed drive 36 which, in turn, is adapted to transmit a signal to the electric motor of motor-driven fan 24 to modulate the speed of fan 24. It will be understood that variable speed drive 36 may be a variable frequency drive or other electrical or electromechanical drive (e.g. an eddy current drive or viscous drive) commonly used and well known to those skilled in the art. The controller is also adapted to transmit a signal to the adjustable discharge air damper 30, the adjustable return air damper 32, and the make-up air damper 36.

The measured toxic exhaust flow rate should be less than the sum of the multiple stack design flow rates calculated under conditions of the air dampers being open. Preferably, the total stack toxic exhaust flow rate is close to or equal to the toxic exhaust flow rate entering from the fume hoods.

From the foregoing, it will be seen that this invention is one well adapted to attain all the ends and objects herein above set forth together with other advantages which are obvious and inherent to the formulation. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth is to be interpreted as illustrative and not in a limiting sense.

What is claimed is:

1. A multi-stack exhaust system, comprising:
   at least one fume hood adapted for intake of toxic exhaust into an inlet duct in fluid communication with the at least one fume hood;
   at least two exhaust stacks, each stack having a return duct with a return damper and a discharge duct with a discharge damper, wherein the return duct returns air and/or toxic exhaust to the inlet duct and the discharge duct discharges toxic exhaust to the environment;
   a fan, adapted to convey the toxic exhaust from the inlet duct to the at least two exhaust stacks;
   a flow sensor for measuring the flow of toxic exhaust in the inlet duct, wherein the discharge dampers are adjusted such that the total flow from the discharge ducts is approximately equal to the flow of toxic exhaust in the inlet duct;

a first static pressure sensor for measuring the static pressure at the inlet duct, wherein an inlet duct static pressure set point is maintained by adjustment of the return dampers; and a second static pressure sensor for measuring the static pressure at the at least two exhaust stacks, wherein an outlet duct static pressure set point is maintained by adjustment of the speed of the exhaust fan.

2. The multi-stack exhaust system of claim 1, further comprising a controller, wherein the flow sensor, the first static pressure sensor, and the second static pressure sensor transmit signals to the controller.

3. The multi-stack exhaust system of claim 2, wherein the controller is further adapted to modulate the fan, the return damper, and the discharge damper.

4. The multi-stack exhaust system of claim 3, wherein the controller is a programmable logic controller adapted to receive and transmit a plurality of input and output signals.

5. The multi-stack exhaust system of claim 1, wherein the discharge damper is adjustable.

6. The multi-stack exhaust system of claim 1, wherein the return damper is adjustable.

7. The multi-stack exhaust system of claim 1, wherein the return damper and the discharge damper for each stack are interlocked.

8. The multi-stack exhaust system of claim 1, further comprising a manual damper is in the return duct.

9. The multi-stack exhaust system of claim 1, further comprising an inlet duct damper.

10. The multi-stack exhaust system of claim 6, wherein the controller is further adapted to modulate the inlet duct damper.

11. The multi-stack exhaust system of claim 1, wherein the fan is a variable-speed fan.

12. The multi-stack system of claim 1, wherein the velocity and momentum of the discharge of toxic exhaust to the environment is maintained by changing the number of stacks in operation.

13. A method for exhausting toxic exhaust, comprising: generating toxic exhaust in at least one fume hood;

passing the exhaust from the at least one fume hood to an inlet duct in fluid communication with the at least one fume hood;

conveying the toxic exhaust to at least two exhaust stacks by a fan, each stack having a return duct with a return damper and a discharge duct with a discharge damper, wherein the return duct returns air and/or toxic exhaust to the inlet duct and the discharge duct discharges toxic exhaust to the environment;

measuring the flow of toxic exhaust in the inlet duct, wherein the discharge dampers are adjusted such that the total flow from the discharge ducts is approximately equal to the flow of toxic exhaust in the inlet duct;

measuring the static pressure at the inlet duct, wherein an inlet duct static pressure set point is maintained by adjustment of the return dampers; and measuring the static pressure at the at least two exhaust stacks, wherein an outlet duct static pressure set point is maintained by adjustment of the speed of the exhaust fan.

14. The method of claim 13, further comprising transmitting an input signal to a controller of the flow of toxic exhaust, static pressure at the inlet duct, and static pressure at the at least two exhaust stacks.

15. The method of claim 14, further comprising modulating the fan, the return damper, and the discharge damper.

16. The method of claim 14, wherein the controller is a programmable logic controller adapted to receive and transmit a plurality of input and output signals.

17. The method of claim 13, wherein the return damper and the discharge damper for each stack are interlocked.

18. The method of claim 13, further comprising manually adjusting a manual damper in the return duct.

19. The method of claim 13, further comprising adjusting an inlet duct damper.

20. The method of claim 19, wherein the controller is further adapted to modulate the inlet duct damper.

21. The method of claim 13, wherein the fan is a variable-speed fan.

22. The method of claim 13, wherein the velocity and momentum of the discharge of toxic exhaust to the environment is maintained by changing the number of stacks in operation.

* * * * *